United States Patent
Samuel et al.

(10) Patent No.: US 12,486,755 B2
(45) Date of Patent: Dec. 2, 2025

(54) PREDICTING A DRILL STRING PACKOFF EVENT

(71) Applicant: Landmark Graphics Corporation, Houston, TX (US)

(72) Inventors: Robello Samuel, Cypress, TX (US); Manish Kumar Mittal, Cypress, TX (US); Rishi Adari, Houston, TX (US); Nanda Kumar Nookala, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 969 days.

(21) Appl. No.: 17/242,526

(22) Filed: Apr. 28, 2021

(65) Prior Publication Data
US 2022/0282610 A1  Sep. 8, 2022

Related U.S. Application Data

(60) Provisional application No. 63/156,148, filed on Mar. 3, 2021.

(51) Int. Cl.
*E21B 44/04* (2006.01)
*E21B 37/00* (2006.01)
(Continued)

(52) U.S. Cl.
CPC .............. *E21B 44/04* (2013.01); *E21B 37/00* (2013.01); *G08B 21/182* (2013.01);
(Continued)

(58) Field of Classification Search
None
See application file for complete search history.

(56) References Cited

U.S. PATENT DOCUMENTS

| 3,765,487 A | 10/1973 | McEver |
| 5,044,198 A * | 9/1991 | Ho ...................... E21B 47/007 |
| | | 73/152.59 |

(Continued)

FOREIGN PATENT DOCUMENTS

CA    2181790 C    4/2000

OTHER PUBLICATIONS

Elzenary, M. N. M. (2019). Estimation of hole cleaning condition in real-time while drilling (operational point of view) (Order No. 29396733). Available from ProQuest Dissertations and Theses Professional. (2780678167). (Year: 2019).*

(Continued)

*Primary Examiner* — Akash Saxena
(74) *Attorney, Agent, or Firm* — Michael Jenney; Parker Justiss, P.C.

(57) ABSTRACT

The disclosure presents processes and methods for determining a packoff event at a location in a borehole undergoing a drilling operation. The packoff event can be represented by a packoff risk indicator (PRI) that presents, for example, a percentage risk of the packoff event occurring. The PRI can be utilized to initiate a remediation operation prior to the packoff event becoming more severe, such as a stuck drill string. In some aspects, the generation of the PRI can utilize an uncertainty model to provide a range of input parameters and an uncertainty parameter used by other systems to evaluate the risk of the potential packoff event has on borehole operations. In some aspects, the generation of the PRI can utilize machine learning algorithms or deep neural network algorithms to pre-process the input parameters to improve the accuracy of the PRI and of the models used to generate the PRI.

25 Claims, 9 Drawing Sheets

(51) Int. Cl.
*G01V 20/00* (2024.01)
*G08B 21/18* (2006.01)

(52) U.S. Cl.
CPC .......... *E21B 2200/20* (2020.05); *G01V 20/00* (2024.01); *G01V 2210/62* (2013.01); *G01V 2210/66* (2013.01)

(56) References Cited

U.S. PATENT DOCUMENTS

| | | | |
|---|---|---|---|
| 5,375,476 A | 12/1994 | Gray | |
| 5,660,239 A * | 8/1997 | Mueller | E21B 44/00 175/57 |
| 6,549,854 B1 * | 4/2003 | Malinverno | G01V 11/00 702/6 |
| 8,752,648 B2 | 6/2014 | Goebel et al. | |
| 9,291,019 B2 * | 3/2016 | Aphale | E21B 31/03 |
| 11,011,043 B2 * | 5/2021 | Nazhan | E21B 44/00 |
| 11,514,382 B2 * | 11/2022 | Mittal | E21B 47/12 |
| 11,959,360 B2 * | 4/2024 | Forshaw | E21B 47/00 |
| 2009/0159333 A1 * | 6/2009 | Guidry | E21B 44/00 702/9 |
| 2012/0059521 A1 | 3/2012 | Iversen et al. | |
| 2013/0090854 A1 | 4/2013 | Rasmus et al. | |
| 2013/0153235 A1 * | 6/2013 | Korn, Jr. | E21B 23/04 166/162 |
| 2013/0153296 A1 * | 6/2013 | Aphale | E21B 41/0078 175/324 |
| 2014/0046628 A1 * | 2/2014 | Ligneul | E21B 49/005 702/158 |
| 2015/0134257 A1 * | 5/2015 | Erge | E21B 49/003 702/9 |
| 2015/0362621 A1 * | 12/2015 | Belaskie | E21B 47/06 702/6 |
| 2016/0053604 A1 * | 2/2016 | Abbassian | E21B 44/00 702/6 |
| 2016/0097270 A1 * | 4/2016 | Pobedinski | E21B 21/08 700/275 |
| 2017/0306726 A1 * | 10/2017 | Alzahrani | E21B 44/00 |
| 2018/0047191 A1 | 2/2018 | Priyadarshy | |
| 2018/0171774 A1 * | 6/2018 | Ringer | E21B 47/002 |
| 2019/0178059 A1 * | 6/2019 | Zheng | E21B 47/00 |
| 2019/0309614 A1 * | 10/2019 | Benson | E21B 49/005 |
| 2019/0316457 A1 * | 10/2019 | Al-Rubaii | E21B 21/08 |
| 2019/0368336 A1 * | 12/2019 | Hammond | E21B 47/11 |
| 2020/0080410 A1 * | 3/2020 | Kjosmoen | E21B 47/06 |
| 2020/0173268 A1 | 6/2020 | Zhang et al. | |
| 2020/0232304 A1 * | 7/2020 | Boulet | E21B 37/10 |
| 2020/0355839 A1 * | 11/2020 | Jeong | E21B 47/00 |
| 2021/0140274 A1 * | 5/2021 | Forshaw | E21B 44/00 |
| 2022/0187494 A1 * | 6/2022 | Samuel | E21B 44/00 |
| 2022/0251950 A1 * | 8/2022 | Al-Malki | E21B 44/00 |
| 2022/0282610 A1 * | 9/2022 | Samuel | E21B 21/00 |
| 2024/0102376 A1 * | 3/2024 | Liu | G01V 20/00 |

OTHER PUBLICATIONS

Samuel, Robello, and Wenjun Huang. "Dynamic Torque and Drag Model." Paper presented at the SPE Annual Technical Conference and Exhibition, Virtual, Oct. 2020. doi: https://doi.org/10.2118/201629-MS (Year: 2020).*

Allahvirdizadeh, P. (2015). A comparative study of cuttings transport performance of water versus polymer-based fluids in horizontal well drilling (Order No. 31677463). Available from ProQuest Dissertations and Theses Professional. (3132859831). (Year: 2015).*

Wikipedia Definition of Drag Coeffient; pp. 9, Retrieved May 30, 2025 (Year: 2025).*

Whitfield; "Sustainability index system incorporates AI, uncertainty modeling throughout the well lifecycle"; Drilling Contractor; IADC; Feb. 23, 2021; 3 pgs.

* cited by examiner

PREDICTING A DRILL STRING PACKOFF EVENT

CROSS-REFERENCE TO RELATED APPLICATION

This application claims the benefit of U.S. Provisional Application Ser. No. 63/156,148, filed on Mar. 3, 2021, entitled "PREDICTING A DRILL STRING PACKOFF EVENT," commonly assigned with this application and incorporated herein by reference in its entirety.

TECHNICAL FIELD

This application is directed, in general, to improving borehole operation efficiency and, more specifically, to analyzing borehole conditions for potential packoff events.

BACKGROUND

In developing a borehole, there can be many factors affecting borehole operations, such as friction, the factors related to friction, and borehole cleaning. Friction can affect the wear of equipment, alter the characteristics of the surrounding formation of the borehole while decreasing borehole operation efficiency. Borehole cleaning can reduce the effect of friction by reducing the build-up of material within the borehole. Borehole cleaning can also affect the ability to trip in or trip out a drill string. Under some conditions, borehole material, such as cuttings and loose subterranean formation material, can build up within a borehole thereby creating a packoff event, such that it may become difficult or impossible to move the drill string. It would be beneficial to be able to improve the prediction of when a packoff event could occur thereby allowing time to perform operations to clear the packoff or potential packoff prior to needing a more expensive operation to clear the borehole material. This can improve the operational efficiency of borehole operations.

SUMMARY

In one aspect, a method to perform a packoff prediction process is disclosed. In one embodiment, the method includes (1) receiving input parameters for at least one of a borehole, a subterranean formation proximate the borehole, and/or a drill string inserted in the borehole, (2) executing a hole cleaning model using the input parameters, (3) estimating a bed height using an output of the hole cleaning model, (4) performing a packoff model using at least one of the input parameters, the output of the hole cleaning model, and/or the bed height, (5) modifying a drag parameter of the drill string and a torque parameter of the drill string using the bed height, and (6) determining an output parameter comprising a packoff risk index (PRI) utilizing at least some of the input parameters, the output of the hole cleaning model, the bed height, the drag parameter, and/or the torque parameter.

In a second aspect, a system is disclosed. In one embodiment, the system includes (1) a data transceiver, capable of receiving input parameters from one or more of downhole sensors of a borehole, surface sensors proximate the borehole, a data store, a previous survey data, a well site controller, a drilling controller, or a computing system, wherein the input parameters include sensor data of a subterranean formation proximate the borehole, and (2) a packoff predictor, capable of using at least some of the input parameters to generate the output parameter, wherein the output parameter comprises a PRI for a location in the borehole.

In a third aspect, a computer program product having a series of operating instructions stored on a non-transitory computer-readable medium that directs a data processing apparatus when executed thereby to perform operations. In one embodiment, the operations include (1) receiving input parameters for at least one of a borehole, a subterranean formation proximate the borehole, and/or a drill string inserted in the borehole, (2) executing a hole cleaning model using the input parameters, (3) estimating a bed height using an output of the hole cleaning model, (4) performing a packoff model using at least one of the input parameters, the output of the hole cleaning model, and/or the bed height, (5) modifying a drag parameter of the drill string and a torque parameter of the drill string using the bed height, and (6) determining an output parameter comprising a PRI utilizing at least some of the input parameters, the output of the hole cleaning model, the bed height, the drag parameter, and/or the torque parameter.

BRIEF DESCRIPTION

Reference is now made to the following descriptions taken in conjunction with the accompanying drawings, in which.

DETAILED DESCRIPTION

Figure 1:
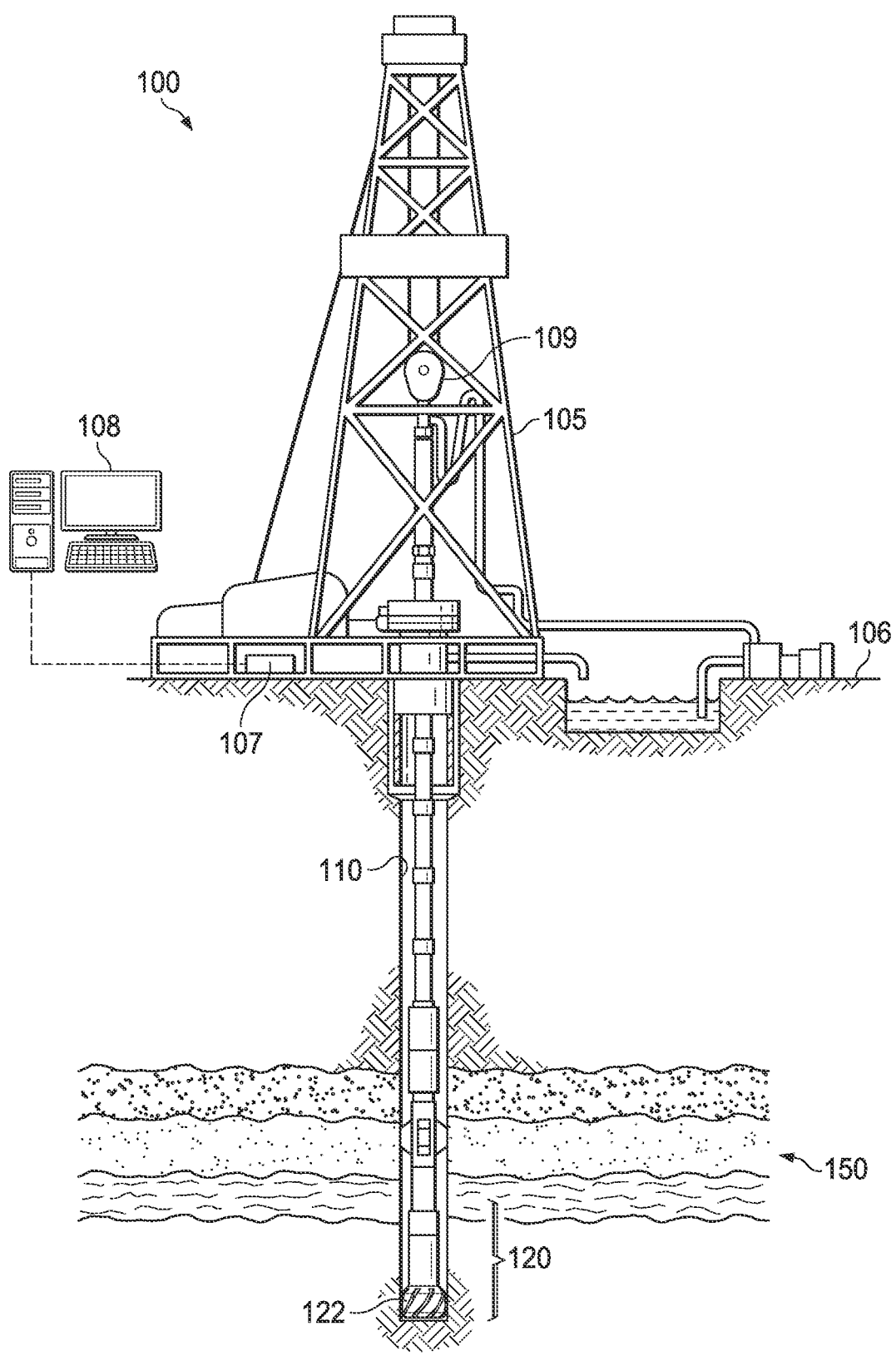
FIG. 1 is an illustration of a diagram of an example drilling borehole system estimating a packoff event.

When developing a borehole, multiple types of borehole operations can be employed, such as drilling, trip in of a drill string, trip out of a drill string (i.e., drill pipe operations), extraction, and other borehole operations. Borehole operations can be affected by friction against the casing, the subterranean formation, and the accumulation of borehole material, e.g., cuttings or subterranean formation material, in the borehole. The friction affects can be in one or more portions of the borehole. For example, a drilling fluid can accumulate cuttings and thereby increase the friction force against a rotating drill string, or the drill string can experience friction against a casing or subterranean formation, such as in a bend or dogleg portion of the borehole. A borehole can be developed for hydrocarbon production purposes, scientific purposes, research purposes, or for other purposes that have operations occurring within a borehole.

As the borehole materials build up within the borehole, an increase in friction with the drill string and equipment attached to the drill string can occur. The borehole material can include, for example, additives added to the drilling fluid or mud, material from the subterranean formation surrounding the borehole, cuttings, portions of downhole tools (e.g., worn off portions or broken tools), or other types of material downhole. Should the borehole material collect, e.g., build up, to a sufficient amount, the downhole operations of the drill string and drilling equipment can be negatively affected. For example, the friction can increase to a factor that severely impacts operations or prevents an operation, for example, a packoff event causing a stuck drill string. The build-up of borehole material can occur more frequently in a lateral or horizontal portion of the borehole where the bed height of the borehole material can build-up and interfere with the operations of the drill string and drilling assembly.

As the borehole material builds to a sufficient level, a packoff event can occur where the borehole material impacts the downhole operations, such as leading to a stuck drill string state. To prevent the packoff event, one or more techniques can be employed to keep the borehole material to a manageable level. Circulating drilling fluid or mud can help remove the borehole material. In some aspects, a hole cleaning operation can be utilized to remove the borehole material.

Hole cleaning that is not be sufficient can lead to a build-up of a cuttings bed, i.e., borehole material bed, on the lateral and horizontal portions of the borehole. The cuttings bed can increase the viscous drag on a drill string, e.g., a section of the drill string, which can lead to increased torque and drag. The increase in torque and drag can result in an inefficient drilling operation, a reduced rate of penetration, a pipe sticking issue, or other borehole operation issues and inefficiencies. The measure of the effect of the cuttings bed on the torque and drag components is typically not known. The drilling operations can benefit from identifying how well the hole cleaning operation performs, as well as the performance of other techniques, to clear borehole material from the borehole or portions of the borehole.

Non-productive time (NPT) of a drilling operation can cause an increase in the expenses of operating the borehole, wherein reducing or removing borehole material can involve NPT, for example, pausing a drilling operation to perform hole cleaning. A portion of NPT can be attributed to stuck drill string states or reduced movement of drill string states, for example, the NPT can be ⅓ of the time of a drilling stage. A packoff event can occur prior to many of the stuck or reduce movement drill string states, therefore, identifying when a packoff event is likely to occur can be beneficial in reducing the operating expenses of the borehole and drilling operation. A metric that can be utilized is a packoff risk index that can provide an indication of the likelihood of a packoff event occurring.

This disclosure presents processes and methods to calculate a packoff risk index (PRI) which can be utilized to determine the effectiveness of hole cleaning operations and other borehole material clearing operations, e.g., remediation operations for an active borehole. The PRI can be used to determine the likelihood of a packoff event occurring. Using the PRI can enable the identification of the occurrence of a packoff event earlier than conventional techniques thereby enabling lower cost remediations to take place, as compared to remediations for severe packoff states, such as a stuck drill string state. For example, in severe packoff states, the drill string and attached downhole tools could be lost or the borehole or a portion of the borehole could be abandoned.

In some aspects, an uncertainty factor can be applied to one or more of the input parameters used to calculate the PRI to generate an uncertainty parameter. The uncertainty parameter can be used in conjunction with the PRI calculation. Since the borehole system can utilize nonlinear systems and asymmetric inputs, the effects of uncertainty of the input parameters can lead to uncertainties of the outputs of the methods and processes. For example, there can be variation and errors in log data, survey data, and other collected sensor data. There can be variation and errors in the drilling parameters used by the drilling operation. There can be uncertainties of the well engineering and life cycle models used to develop the borehole operation plan and drilling operation plan. Some models used by the drilling operation can be simplified models. There can be computational uncertainties and different weight distributions can be utilized for the various input parameters.

Uncertainty analysis provides an opportunity to calculate risks involved while not assigning preferential weightage to some of the components. The disclosed methods and processes can estimate the influence of various parameters on the sustainability index. The sustainability index can be used to estimate and display sustainability in well design and operation. The sustainability index can be a weighted multidimensional model grounded in engineering principles that enables optimal decision making with regards to sustainability. The methodology can be a collection of well-level report cards that can be used to measure key performance indicators (KPIs). The uncertainty analysis can perform a more in-depth sensitivity analysis on input variables and on the output sustainability index. The uncertainty analysis can provide an understanding of the risk involved utilizing the outcome of the output. There are many techniques available to estimate the uncertainty, for example, a stochastic multi-criteria decision analysis. Different weight distributions can be combined when estimating output uncertainty, for example, the weighting models shown in FIG. 5.

The uncertainty parameter and PRI can be utilized by a drilling operation to determine when remediation operations should occur or to adjust the drilling operations, e.g., to identify potential risks of the drilling operation. In some aspects, the determination of the PRI and the adjustments to the drilling operation can be made in real-time or near real-time. In some aspects, the PRI can be used as an input to the drilling operations to automatically adjust the drilling operations or implement a remediation operation. In some aspects, the PRI can be used to generate a visualization for a user to review.

In some aspects, a machine learning system or a deep neural network system can be utilized that can receive the input parameters and determine the PRI and uncertainty parameters. As new information is communicated to the machine learning system or deep neural network system, the accuracy of the outputs can increase, thereby reducing the uncertainty parameter. For example, feedback from the output parameter can be used to train the machine learning or the deep neural network system. In some aspects, the methods and processes described herein can be utilized to analyze historical data to improve the accuracy of the machine learning system or deep neural network system.

In some aspects, the methods and processes can provide a methodology to predict a packoff event using physics modeling, data modeling, and uncertainty modeling. In some aspects, the components that can be utilized by the methods and processes can include a hole cleaning model to predict the accumulated bed height of the borehole material, a plug interaction model that connects the borehole material accumulation with the movement of the drill string, a hook load model to delink the borehole tortuosity effect, and an uncertainty algorithm to account for uncertainty in the input parameters.

In some aspects, the methods and processes can provide a methodology to better understand the packoff event prediction as compared to using the friction factor as the primary parameter for quantifying the borehole conditions prior to installing casing in the borehole. This methodology can utilize one or more parameters, for example, a geometrical parameter, a mechanical parameter, a fluid parameter, or a hydromechanical coupling parameter. The geometrical parameter can be one or more of a curvature parameter, e.g., dogleg parameter, a borehole torsion parameter, or other geometrical parameters. The mechanical parameter can be influenced by the drilling operations, for example, increased friction, compression, or other forces on the drill string. The mechanical parameter can be one or more of a push force parameter, a maximum bending parameter, a maximum bending stress parameter, a fatigue ratio parameter, or other mechanical parameters. The fluid parameter can be one or more of a viscous drag parameter, a cuttings drag parameter, or other fluid parameters.

In some aspects, the methods and processes described herein can be encapsulated as a function or a series of functions, for example, one or more microservices, which can be accessed by the drilling operation or another borehole operation. For example, a first function, e.g., microservice, can be utilized to generate the PRI and a second function can be utilized to generate the uncertainty parameter.

In some aspects, the drilling operations can be directed by a drilling controller, a well site controller, a bottom hole assembly (BHA), a proximate computing system, an edge computing system, or a distant computing system, for example, a cloud environment, a data center, a server, a laptop, a smartphone, or other computing systems. In some aspects, a portion of the disclosed methods and processes can be performed by downhole tools, such as by a drilling assembly or a reservoir description tool.

Turning now to the figures, FIG. 1 is an illustration of a diagram of an example drilling borehole system 100 estimating a packoff event. Drilling borehole system 100 can be a drilling system, a logging while drilling (LWD) system, a measuring while drilling (MWD) system, a seismic while drilling (SWD) system, a telemetry while drilling (TWD) system, and other hydrocarbon well systems, such as a relief well or an intercept well. Drilling borehole system 100 includes a derrick 105, a well site controller 107, and a computing system 108. Well site controller 107 includes a processor and a memory and is configured to direct operation of drilling borehole system 100. In some aspects, well site controller 107 can be a drilling controller. Derrick 105 is located at a surface 106.

Derrick 105 includes a traveling block 109 that includes a drill string hook. Traveling block 109 includes surface sensors to collect data on hook-load and torque experienced at traveling block 109. Extending below derrick 105 is a borehole 110, e.g., an active borehole, with downhole tools 120 at the end of a drill string. Downhole tools 120 can include various downhole tools and BHA, such as drilling bit 122. Other components of downhole tools 120 can be present, such as a local power supply (e.g., generators, batteries, or capacitors), telemetry systems, downhole sensors, transceivers, and control systems. The various sensors can be one or more of one or more downhole sensors or one or more surface sensors that can provide one or more hole cleaning parameters, and cuttings and other material parameters to other systems. Borehole 110 is surrounded by subterranean formation 150.

Well site controller 107 or computing system 108 which can be communicatively coupled to well site controller 107, can be utilized to communicate with downhole tools 120, such as sending and receiving telemetry, data, drilling sensor data, instructions, and other information, including hole cleaning parameters, cuttings and other material parameters, bed heights, weighting parameters, location within the borehole, a cuttings density, a cuttings load, a cuttings shape, a cuttings size, a deviation, a drill string rotation rate, a drill string size, a flow regime, a hole size, a mud density, a mud rheology, a mud velocity, a pipe eccentricity, and other input parameters.

Computing system 108 can be proximate well site controller 107 or be distant, such as in a cloud environment, a data center, a lab, or a corporate office. Computing system 108 can be a laptop, smartphone, PDA, server, desktop computer, cloud computing system, other computing systems, or a combination thereof, that are operable to perform the processes and methods described herein. Well site operators, engineers, and other personnel can send and receive data, instructions, measurements, and other information by various conventional means with computing system 108 or well site controller 107.

In some aspects, a PRI processor or an uncertainty processor can be part of well site controller 107 or computing system 108. The PRI processor or the uncertainty processor can receive the various input parameters, such as from a data source, previous survey data, real-time or near real-time data received from sensors downhole or at a surface location, and perform the methods and processes disclosed herein. The results of the analysis can be communicated to a drilling operations system, a geo-steering system, or other well site system or user where the results can be used as inputs to direct further borehole operations. In some aspects, computing system 108 can be located with downhole tools 120 and the computations can be completed at the downhole location. The results can be communicated to a drilling system, a drilling controller, or to a drilling operation system downhole or at a surface location.

FIG. 1 depicts an onshore operation. Those skilled in the art will understand that the disclosure is equally well suited for use in offshore operations. FIG. 1 depicts a specific borehole configuration, those skilled in the art will understand that the disclosure is equally well suited for use in boreholes having other orientations including vertical boreholes, horizontal boreholes, slanted boreholes, multilateral boreholes, and other borehole types.

Figure 2:
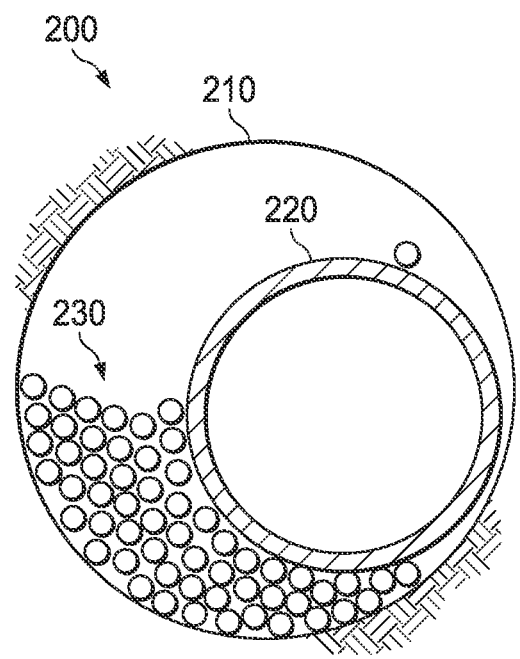
FIG. 2 is an illustration of a diagram of an example borehole system with cuttings and a drill string.

FIG. 2 is an illustration of diagrams of an example borehole system 200 with cuttings and a drill string. As drilling operations progress, cuttings and other borehole material can settle around the drill string. Borehole system 200 has an active borehole 210 where inserted within is a drill string 220. Active borehole 210 is a portion of a borehole and has a horizontal orientation. Cuttings 230 are shown building up around drill string 220. As cuttings 230 build-up, drill string 220 can experience increased friction, increased torque resistance, and other mechanical parameters. As cuttings 230 continue to increase, a packoff event could occur. Identifying this situation, such as where hole cleaning was not adequate, can be beneficial in maintaining operations at an acceptable efficiency level.

Figure 3A:
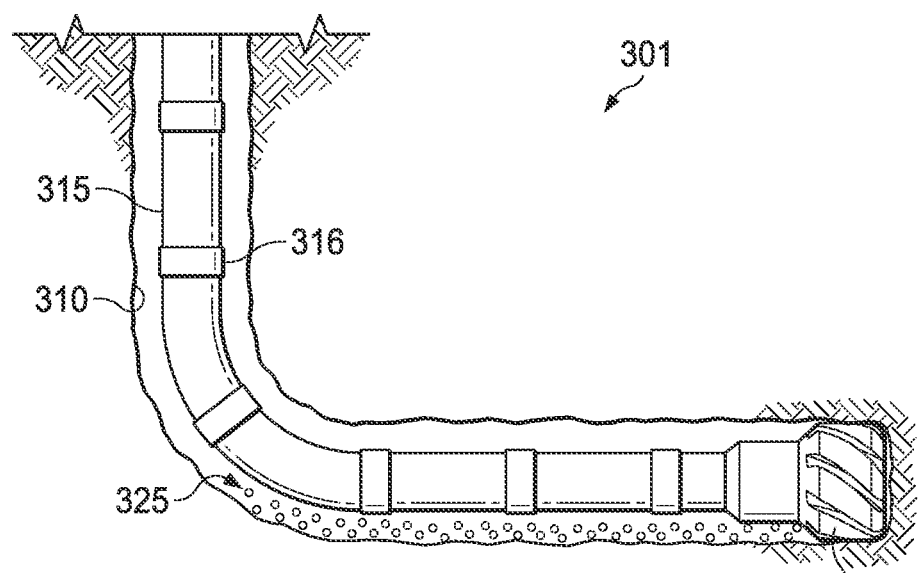
FIG. 3A and FIG. 3B illustrate diagrams of an example drill string trip out operation demonstrating a potential packoff event.
Figure 3B:
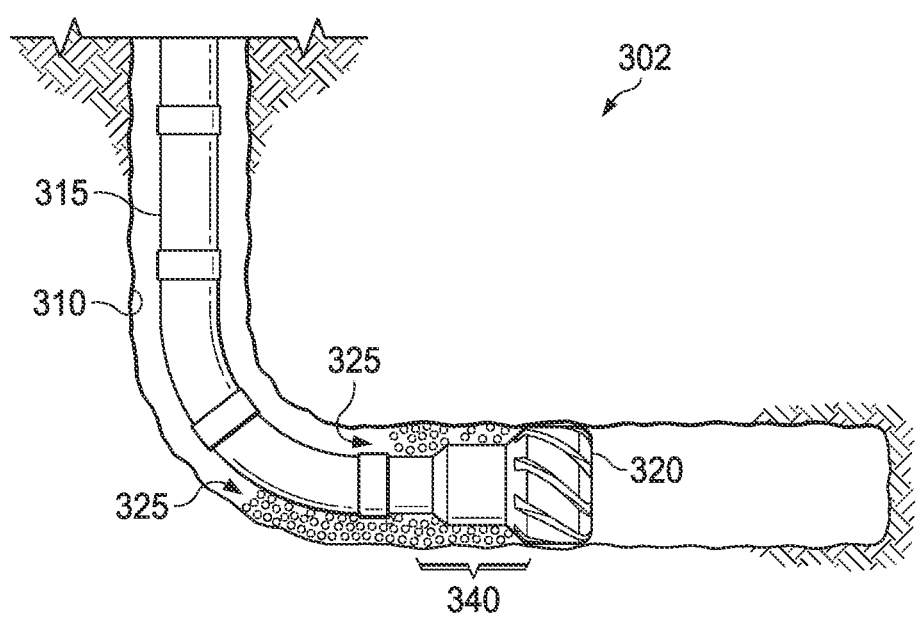

FIG. 3A and FIG. 3B illustrate diagrams 301 and 302 of an example drill string trip out operation demonstrating a potential packoff event. Diagram 301 shows a first state of an active borehole 310 with a drill string 315 inserted into active borehole 310. Drill string 315 has drill string joints 316 and a drill bit assembly 320 at the end of drill string 315. Cuttings 325 have settled along a horizontal portion of active borehole 310.

Diagram 302 shows active borehole 310 after the drill string trip out operation has begun. Cuttings 325 have now collected behind drill bit assembly 320 and could cause an increase on the drag or torque friction factors. The increase of drag and torque can cause inefficiencies of the borehole operation, increase wear and tear on the machinery and components of the overall borehole system, or in severe cases, can cause the drill string to become stuck. Packoff event 340 has been identified as likely prior to drill string 315 being in a stuck drill string state, for example, a PRI of greater than 50%. Therefore, a lower cost remediation can be implemented as compared to the cost of a remediation for a stuck drill string state.

Figure 4:
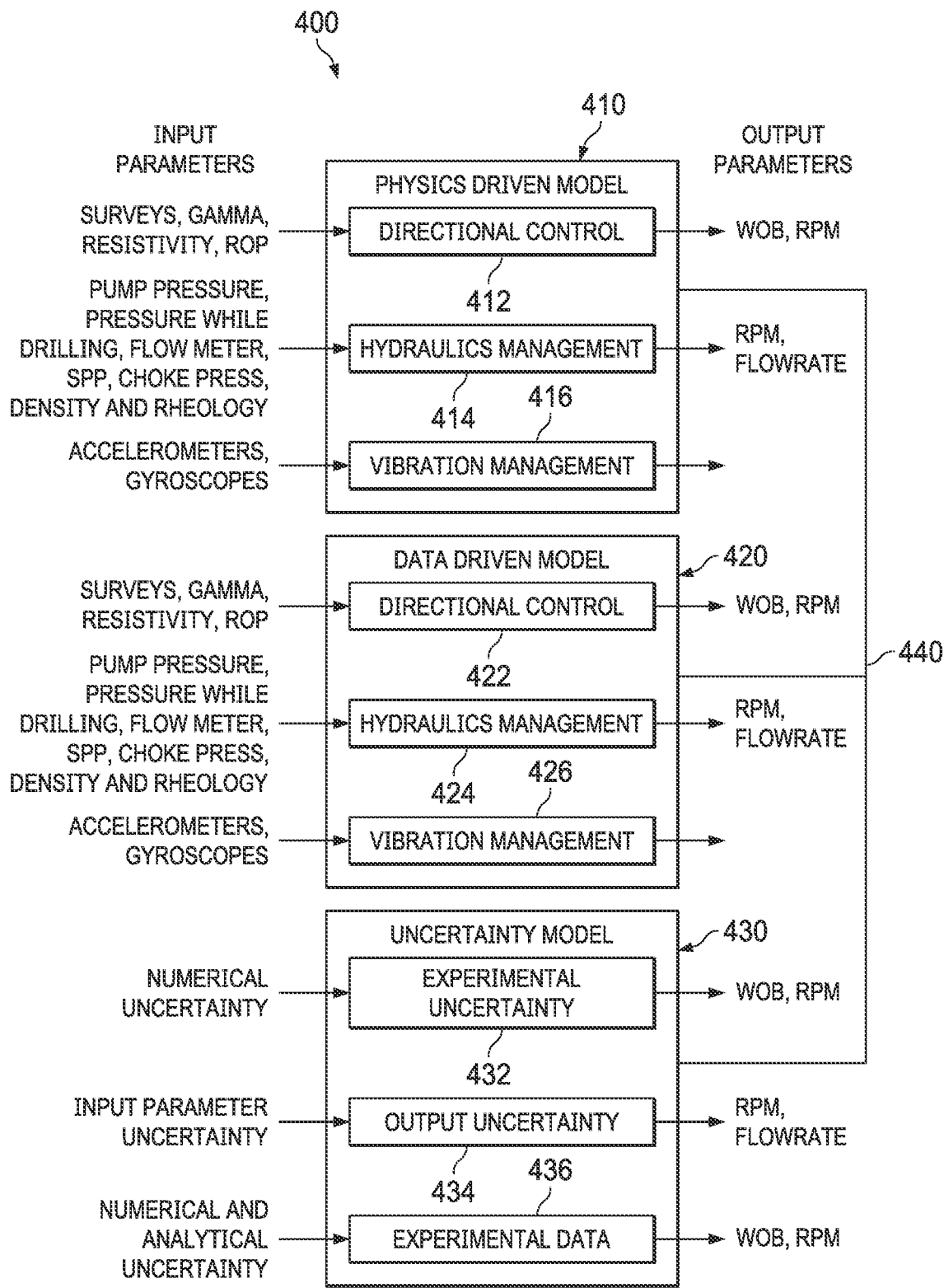
FIG. 4 is an illustration of a block diagram of example functional services to predict a packoff event.

FIG. 4 is an illustration of a block diagram of example functional services 400 utilized to predict a packoff event. Functional services 400 can be implemented as one or more functions or microservices, such as in a code library, dynamic link library, code module, function, application function, software object, encoded in RAM or ROM, or various combinations thereof. Functional services 400 demonstrates a coupling of three concepts to process the input parameters and to generate the output parameters. Functional services 400 can be implemented, for example, by packoff prediction system 900 of FIG. 9 or packoff prediction controller 1000 of FIG. 10.

Functional services 400 has three service components, a physics driven model 410, a data driven model 420, and an uncertainty model 430. Physics driven model 410 includes a directional control 412, a hydraulics management 414, and a vibration management 416. Directional control 412 utilizes input parameters such as surveys, logs, gamma parameters, resistivity parameters, rate of penetration (ROP) parameters, and other data collected by sensors downhole or at a surface location. Directional control 412 can generate an output of a recommended weight on bit (WOB) or rotations per minute (RPM) of the drill string. Hydraulics management 414 utilizes input parameters such as a pump pressure parameter, a pressure while drilling parameter, a flow meter parameter, a slow pump pressure (SPP) parameter, a choke press parameter, a density parameter, or a rheology parameter. Hydraulic management 414 can generate an output of a recommended a RPM of the drill string or a flow rate of downhole fluids.

Data driven model 420 is similar to physics driven model 410 and includes a directional control 422, a hydraulics management 424, and a vibration management 426. Directional control 422 utilizes input parameters such as surveys, logs, gamma parameters, resistivity parameters, ROP parameters, and other data collected by sensors downhole or at a surface location. Directional control 422 can generate an output of a recommended WOB or RPM of the drill string. Hydraulics management 424 utilizes input parameters such as a pump pressure parameter, a pressure while drilling parameter, a flow meter parameter, a SPP parameter, a choke press parameter, a density parameter, or a rheology parameter. Hydraulic management 424 can generate an output of a recommended a RPM of the drill string or a flow rate of downhole fluids.

Uncertainty model 430 includes an experimental uncertainty 432, an output uncertainty 434, and an experimental data 436. Experimental uncertainty 432 utilizes input parameters such as a numerical uncertainty, e.g., $U_{num}+/-$. Experimental uncertainty 432 can generate an output of a recommended WOB or a RPM of the drill string. Output uncertainty 434 utilizes input parameters such as an input parameter uncertainty, e.g., $U_{data}+/-$. Output uncertainty 434 can generate an output of a recommended RPM of the drill string or a flow rate of downhole fluids. Experimental data 436 utilizes input parameters such as a numerical and analytical uncertainty, e.g., $U_{inputs}+/-$. Experimental data 436 can generate an output of a recommended WOB or RPM of the drill string.

Communication connection 440 allows physics driven model 410, data driven model 420, and uncertainty model 430 to share input data and utilize an output from one model in a different model. For example, the RPM output from experimental uncertainty 432 can be utilized in conjunction with directional control 422 and hydraulics management 414 to generate a final RPM recommendation.

Figure 5:
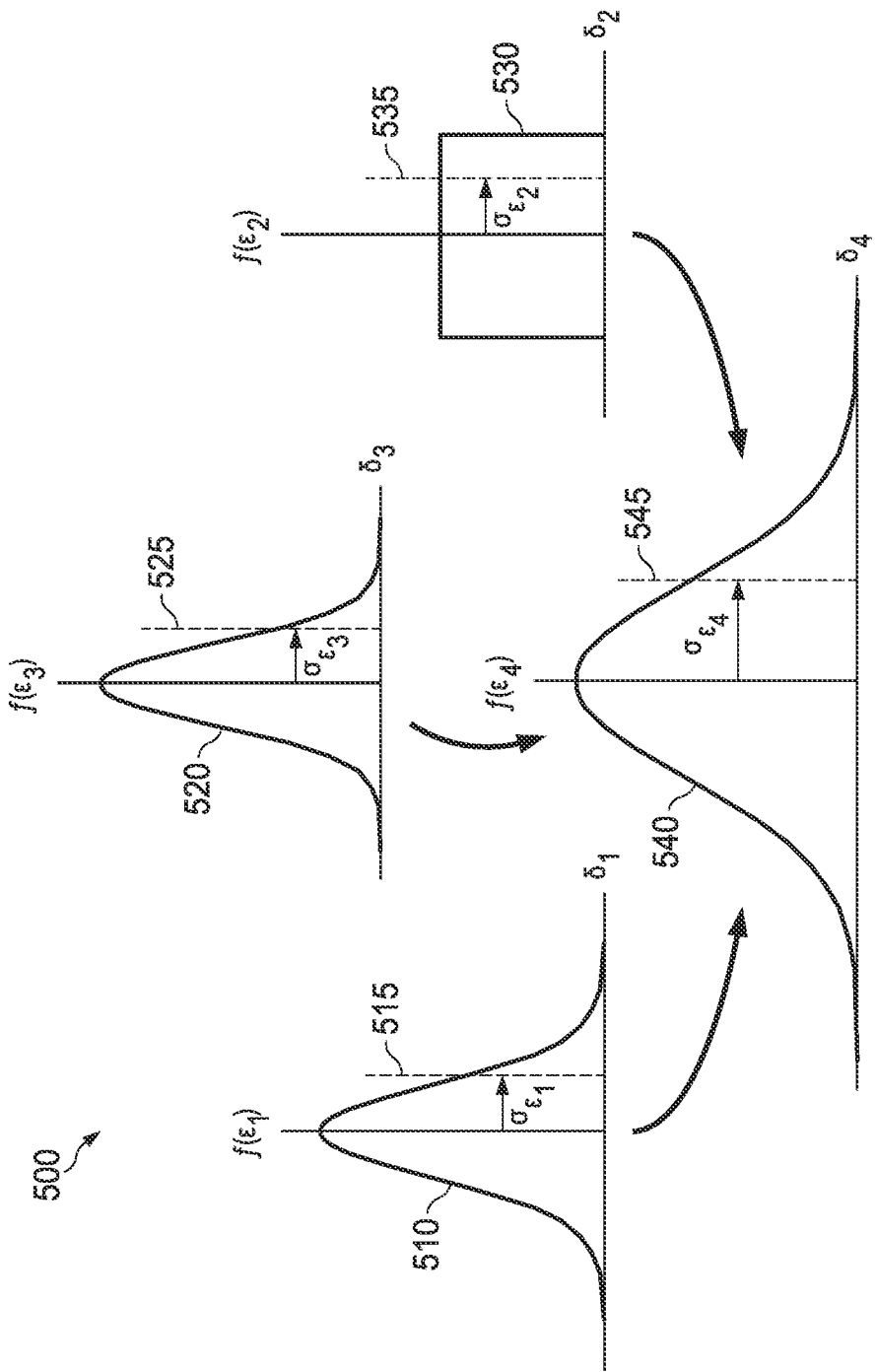
FIG. 5 is an illustration of diagrams of example weight distributions used to estimate uncertainty when predicting a packoff event.

FIG. 5 is an illustration of diagrams of example weight distributions 500 used to estimate uncertainty when predicting a packoff event. The borehole life cycle can involve several non-linear system and asymmetric inputs, for example, variations and errors in log data, survey data, and other data sources, variations and errors in drilling parameters, borehole engineering and life cycle model uncertainties, models that can be simplified for the borehole operation, computational uncertainties, and other variations that can occur in borehole operations. Uncertainty analysis can provide an opportunity to calculate risks involved while not assigning preferential weightage to some of the components. The method can estimate the influence of various parameters on the sustainability index. This can provide a method for performing more in depth sensitivity analysis on input variables on the output sustainability index. It can help provide an understanding of the risk involved based on the outcome of the output. There are many techniques available to estimate uncertainty in the model, such as a stochastic multi-criteria decision analysis method.

Weight distributions 500 demonstrate one such technique, such as a first weight distribution curve 510 with one standard deviation shown as line 515, a second weight distribution curve 520 with one standard deviation shown as line 525, and third weight distribution curve 530 with one standard deviation shown as line 535. In some aspects, there can be fewer weight distribution curves used in the computation. In some aspects, there can be additional weight distribution curves used in the computation. In some aspects, the selected weight distribution curves can be combined into a computed weight distribution curve 540 with one standard deviation shown as line 545. Computed weight distribution curve 540 can be utilized, for example, to identify the uncertainty range of the parameters that are used to compute the PRI. The weight distributions 500 can be used in uncertainty model 650 of FIG. 6.

Figure 6:
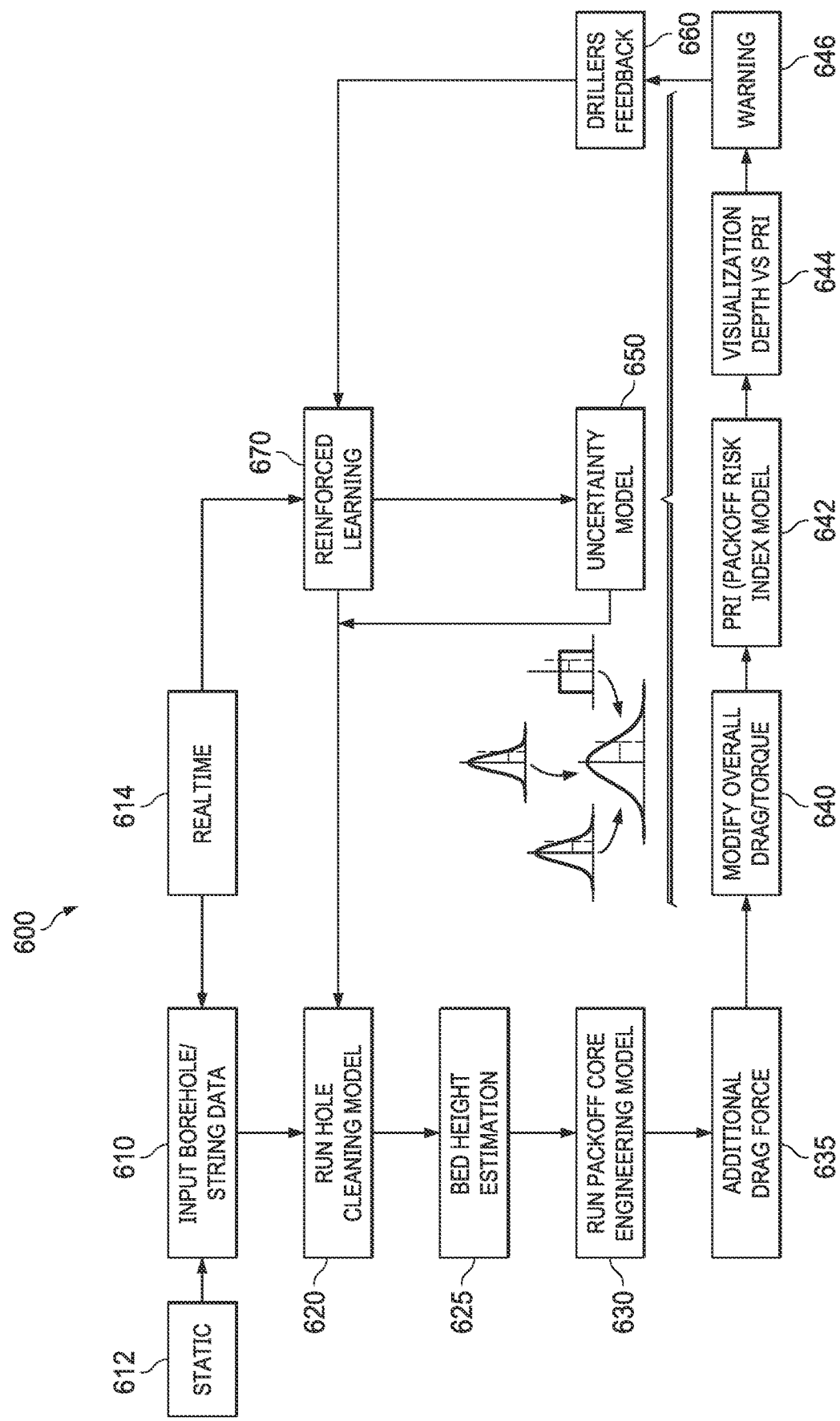
FIG. 6 is an illustration of a flow diagram of an example functional view of a packoff prediction process.

FIG. 6 is an illustration of a flow diagram of an example functional view 600 of a packoff prediction process. Functional view 600 demonstrates an example flow of the functional steps of the methods and processes described herein by illustrating the coordination and message flows of various functions, modules, and services, e.g., microservices, which can be used to implement the disclosed methods, such as method 800. Input parameters 610 are received by functional view 600. Input parameters 610 can be parameters collected from the borehole, for example, downhole sensors collecting temperature and pressure parameters, fluid composition parameters, subterranean formation parameters, and other borehole parameters. Other parameters can be received from the drilling system, such as the drill string parameters, the hook load, the WOB, the RPM, the torque, and other drilling system parameters. The input parameters can be static parameters 612 or real-time or near real-time parameters 614. For example, static parameters 612 can be the geo-mechanical parameters, the stratigraphy, the lithology, or other static parameters. Real-time or near real-time parameters 614 can be, for example, data collected from sensors located downhole or at a surface location.

At a prescribed time, a hole cleaning model 620 can be run to determine the results of a hole cleaning operation on the borehole conditions using the input parameters. A bed height estimation 625 can be generated using the results of hole cleaning model 620, where the bed height can be the height of the borehole material at a determined location within the borehole. A packoff core engineering model 630 can be run using the output of bed height estimation 625. In some aspects, packoff core engineering model 630 can be a combination of a hydraulic hole cleaning model and a mechanical drag force model. An additional drag force parameter 635 can be computed from the output of packoff core engineering model 630.

A modification of the drag and torque parameters on the drill string can be performed by drag/torque model 640 using the output from additional drag force parameter 635. A PRI model 642 can be generated using the output of the drag/torque model 640. A PRI feedback process 644 can generate a current risk assessment of a packoff event using the output of PRI model 642. In some aspects, PRI feedback process 644 can be a computational model used for automatic processing of the outputs and communication to a drilling controller. In some aspects, PRI feedback process 644 can be a visualization of a depth versus the PRI, such as when a user is reviewing the output. Warning system 646 can generate a warning to a drilling controller or to a user if the PRI indicates that a packoff event is likely to occur. In some aspects, drag/torque model 640, PRI model 642, PRI feedback process 644, and warning system 646 can utilize an uncertainty model 650 to provide a range of uncertainty for the input and respective outputs of each functional block.

A drillers feedback 660 can receive the output from warning system 646 and perform remediation at the location of the borehole where the input parameters are associated, for example, at a dogleg or horizontal section of the borehole. As new sensor data is received at reinforced learning 670, including an output on the remediation from drillers feedback 660, the various models utilized in functional view 600 can be updated to increase the accuracy of the outputs from each of the models, processes, and systems. Uncertainty model 650 can be updated using the output of reinforced learning 670. In some aspects, a machine learning system or a deep neural network system can be utilized as part of reinforced learning 670 to further improve the outputs from each of the models, processes, and systems of functional view 600.

Figure 7:
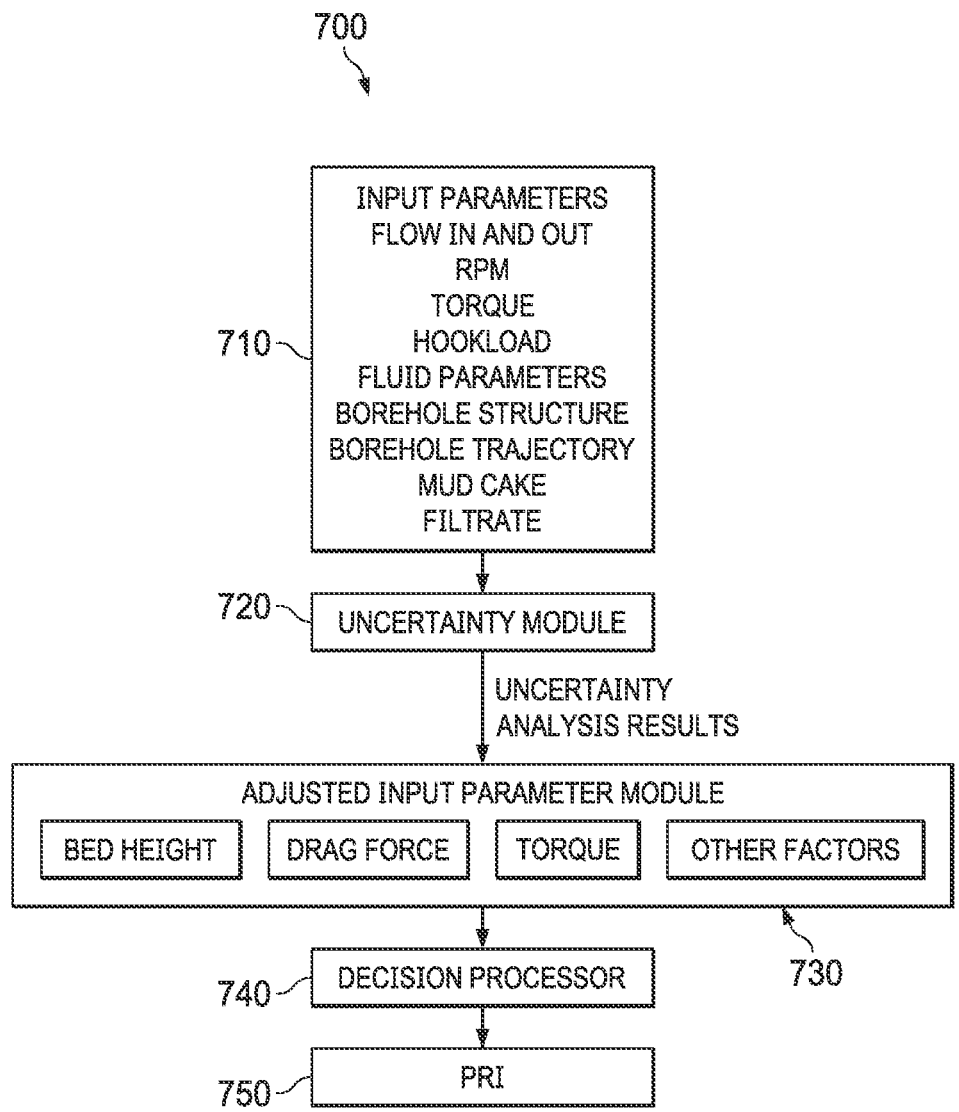
FIG. 7 is an illustration of a flow diagram of an example uncertainty adjustment flow for a packoff prediction process.

FIG. 7 is an illustration of a flow diagram of an example uncertainty adjustment flow 700 for a packoff prediction process. Uncertainty adjustment flow 700 demonstrates the disclosed methods and processes as a flow using the uncertainty model to adjust the input parameters. Input parameters 710 shows a partial list of input parameters that can be received, such as the fluid flow in and out of the borehole, the RPM of the drill string, the torque applied to the drill string, the hook load experienced on the drill string, the fluid parameters such as composition of the fluid, the borehole structure such as the composition of the subterranean formation, the borehole trajectory, the mud cake, the filtrates present, and other input parameters. These input parameters can be collected by one or more sensors located downhole in the borehole or at a surface location.

Input parameters 710 can be processed by an uncertainty module 720. Uncertainty module 720 can apply one or more weighting distribution algorithms to determine a range of values for each input parameter utilizing the potential uncertainty of each collected input parameter. Various sensors can have a variety of uncertainty of the data that is collected and uncertainty module 720 can provide an uncertainty parameter for each respective input parameter according to the uncertainty of the collected data. Uncertainty module 720 can output the one or more uncertainty parameters to an adjusted input parameter module 730. Adjusted input parameter module 730 can adjust each respective input parameter according to the associated uncertainty parameter. The input parameters can be the bed height, the drag force on the drill string, the torque on the drill string, and other factors used as inputs to the PRI calculation. The adjusted input parameters can be output to other modules, such as a decision processor 740 to generate the PRI 750 which can be utilized by other functions, processes, or systems. The uncertainty module 720, the adjusted input parameter module 730, and the decision processor 740 can be individual processors or implemented on one or two processors.

Figure 8:
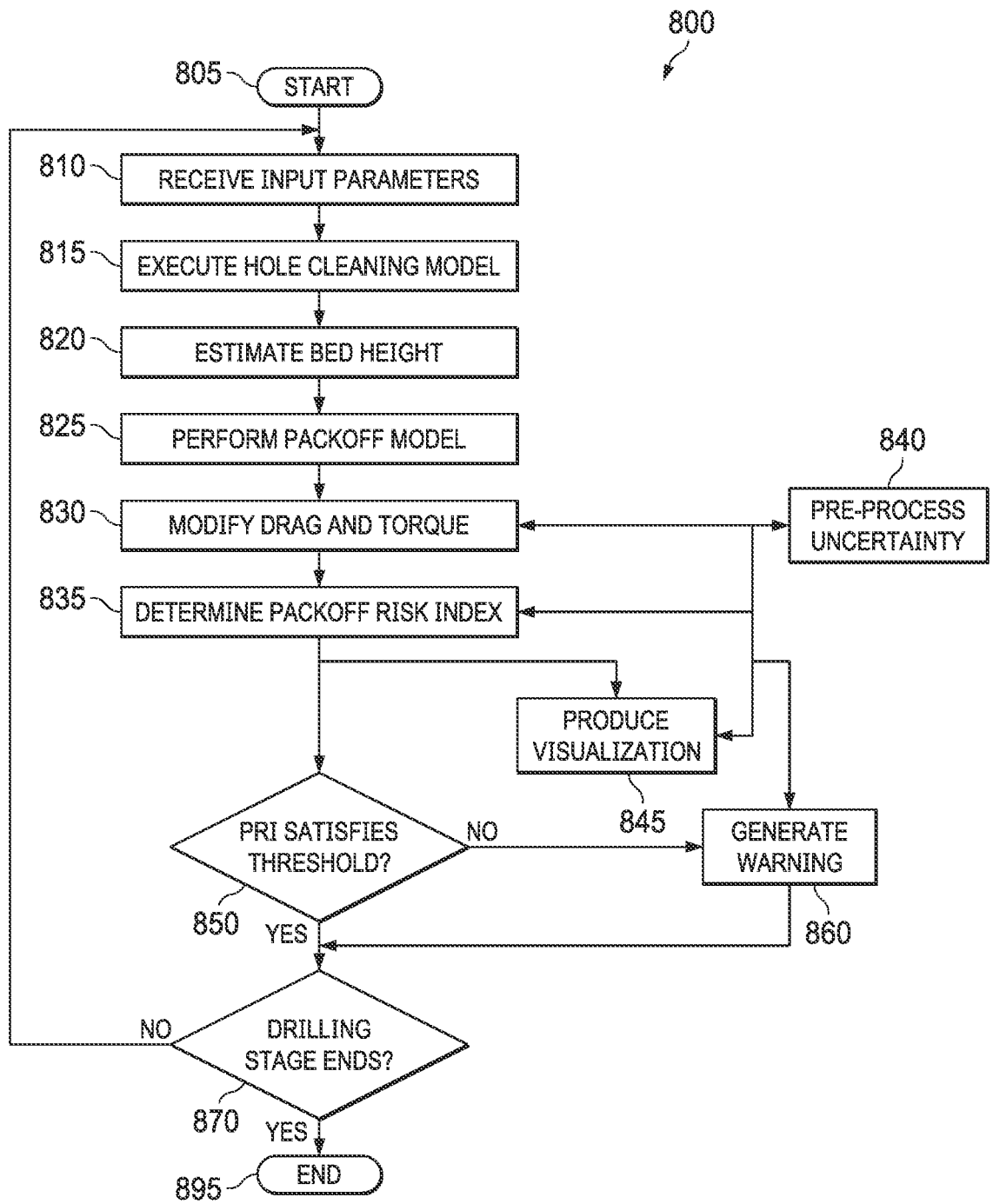
FIG. 8 is an illustration of a flow diagram of an example method to predict a packoff event.

FIG. 8 is an illustration of a flow diagram of an example method 800 to predict a packoff event, e.g., a packoff prediction process. Method 800 can be performed on a computing system, such as a well site controller, a drilling controller, a geo-steering system, a BHA, an edge computing system, or other computing system capable of receiving the various survey parameters and inputs, and capable of communicating with equipment or a user at a borehole site. Other computing systems can be a smartphone, PDA, laptop computer, desktop computer, server, data center, cloud environment, or other computing system. Method 800 can be encapsulated in software code or in hardware, for example, an application, code library, dynamic link library, module, function, RAM, ROM, and other software and hardware implementations. The software can be stored in a file, database, or other computing system storage mechanism. Method 800 can be partially implemented in software and partially in hardware. Method 800 can perform the operations within the computing system or, in some aspects, generate a visual component, for example, a chart or graph showing the borehole depth and PRI overlaid with a weighted distribution curve. Method 800, or at least a portion thereof, corresponds to an algorithm for predicting a packoff event and can be performed partially or wholly by packoff prediction system 900 of FIG. 9 or packoff prediction controller 1000 of FIG. 10.

Method 800 starts at a step 805 and proceeds to a step 810. In step 810, input parameters can be received. Input parameters can be received from sensors in real-time or near real-time, such as downhole sensors, surface sensors, drilling string sensors, and drilling operation sensors. Input parameters can be received from one or more data sources, such as stratigraphy, lithology, geo-mechanical, or sensor data collected at a previous time interval or from a proximate borehole. Input parameters can also include instructions, data, and parameters to operate the method, such as a selected weighting distribution algorithm to use, a machine learning algorithm to use, a PRI threshold, a time interval to perform the method steps, and other parameters.

The data sources can be one or more various data sources, such as a well site controller, a server, laptop, PDA, desktop computer, database, file store, cloud storage, data center, or other types of data stores, and be located downhole, at a surface location, proximate the borehole, distant from the borehole, in a lab, an office, a data center, or a cloud environment.

From step 810, method 800 proceeds to a step 815 where a hole cleaning model can be executed. The hole cleaning model can utilize the input parameters to determine the effects of hole cleaning on the borehole location. In a step 820, the bed height of the borehole material at a location within the borehole can be computed using the hole cleaning model of step 815. In a step 825, a packoff model can be executed (or performed) using the output from step 815 and step 820, as well as the input parameters. The packoff model can determine an initial packoff estimation occurring at the downhole location.

In a step 830, the drag force and the torque experienced on the drill string can be calculated. This can be the increase in drag and torque on the drill string due to the presence of the borehole material in the packoff area. In some aspects, step 830 can proceed to a step 840 prior to completing the actions in step 830. Step 840 can receive the input parameters to step 830 and adjust them according to the selected uncertainty algorithm. For example, an uncertainty model can output a weighted distribution range of adjusted input parameters. This can pre-process the input parameters which can then be utilized by the remaining actions of step 830.

Proceeding to a step 835 from step 830, a PRI can be determined. In some aspects, the PRI can be a percentage reflecting the potential that a packoff event could occur at the location in the borehole. In some aspects, step 835 can proceed to step 840 prior to completing the actions in step 835. Step 840 can receive the input parameters to step 835 and adjust them according to the selected uncertainty algorithm. For example, an uncertainty model can output a weighted distribution range of adjusted input parameters. This can pre-process the input parameters which can then be utilized by the remaining actions of step 835. In these aspects, the determined PRI can include uncertainty parameters further refining the output parameters, for example, providing a range of percentages for the PRI or providing a weighted range of percentages for the PRI.

Proceeding from step 835, if the input parameters indicate a user is to receive the output parameters of method 800, then a step 845 is performed to produce a visualization of the PRI at the depth and location in the borehole. Other data can be overlaid the visualization, for example, subterranean formation characteristics, the projected borehole path, proximate boreholes, and other data. The visualization can be used by a user for decision making on whether a change to the drilling operation should be made, for example, increasing the number of hole cleaning operations, or initiating another remediation for the packoff event. In some aspects, step 845 can proceed to a step 840 prior to completing the actions in step 845. Step 840 can receive the input parameters to step 845 and adjust them according to the selected uncertainty algorithm. For example, an uncertainty model can output a weighted distribution range of adjusted input parameters. This can pre-process the input parameters which can then be utilized by the remaining actions of step 845

Parallel to the performance of step 845, a decision step 850 is performed. Decision step 850 can determine whether a PRI threshold is satisfied. In some aspects, decision step 850 can communicate the output parameters, such as the PRI and the uncertainty parameters, to another function, process, or system, such as borehole operation system 950 of FIG. 9. These output parameters can be used to refine the various models used herein and refine the machine learning algorithm or the deep neural network algorithm. For example, if PRI is represented as a percentage, then a PRI threshold can be specified in the input parameters as 50%, meaning that if the PRI is 50% or lower, the PRI threshold is satisfied and no warning is needed. If decision step 850 results in the PRI threshold being satisfied, then method 800 proceeds to a decision step 870. If decision step 850 results in the PRI threshold not being satisfied, then method 800 proceeds to a step 860.

In step 860, a warning can be generated that a potential packoff event could occur. In some aspects, the warning can be communicated automatically to another function, system, or process, for example, a drilling controller or a well site controller. Those systems can automatically initiate remediation actions to avoid the packoff event. In some aspects, the remediation actions can include calculating a packoff reduction job action utilizing the PRI threshold. The packoff reduction job action can be various actions, such as pipe rotation or fluid pumping, to reduce the packoff potential, e.g., reducing or eroding the bed height. The scope or extent of the packoff reduction job action can be proportional to the PRI threshold and the packoff potential. These aspects can provide a control loop to control the drilling stage job plan automatically or through a user operation, where the control loop incorporates the receiver of the warning, the pumping units, the rotary system, and other drilling devices.

In some aspects, the warning can be communicated to a user, where the user can utilize decision making to determine whether and what type of remediation operations should occur. The user can adjust the drilling operation plan for the remediation operation.

In decision step 870, a determination can be made whether the drilling stage has completed, such as when an end of drilling stage event occurs. If the drilling stage is completed, method 800 proceeds to a step 895 and ends. If the drilling stage is not completed, method 800 proceeds to step 810 and at the specified time interval, can receive an updated set of input parameters, such as from downhole sensors and surface sensors. Method 800 can be performed in real-time, near real-time, or can be performed at a scheduled time interval.

Figure 9:
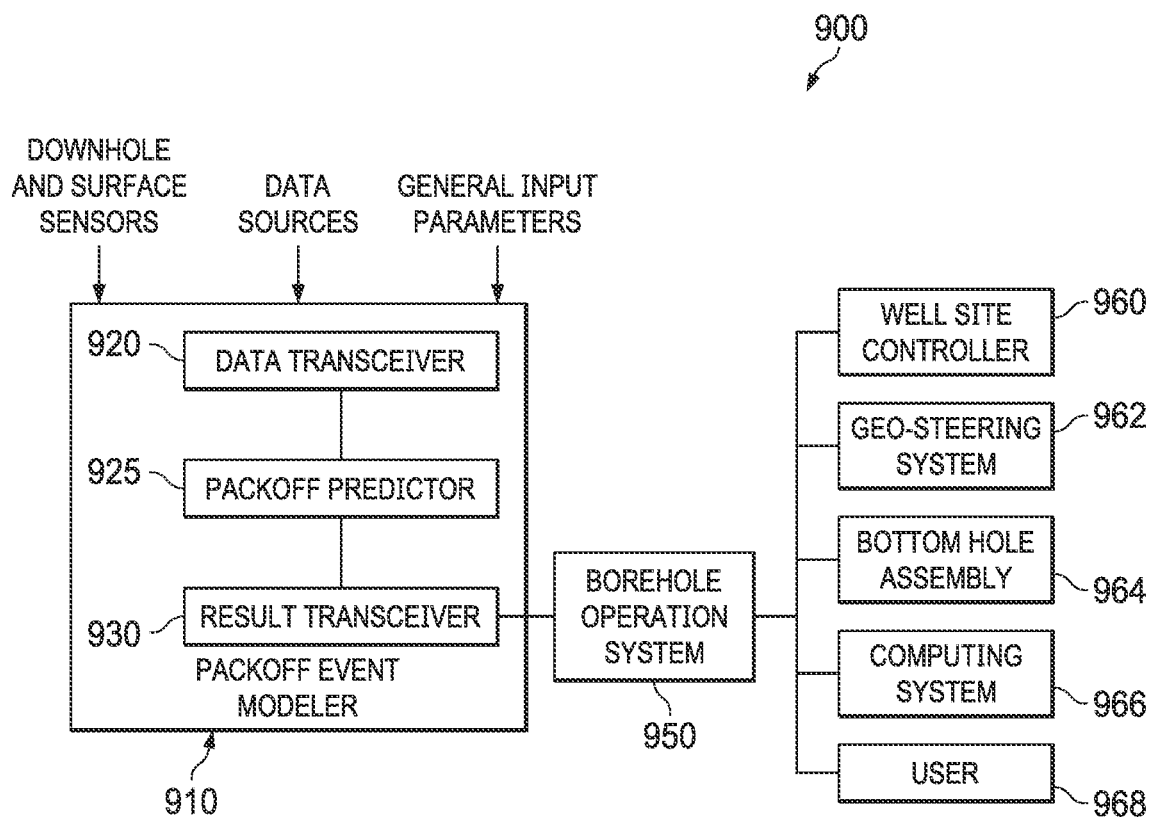
FIG. 9 is an illustration of a block diagram of an example packoff prediction system.

FIG. 9 is an illustration of a block diagram of an example packoff prediction system 900, which can be implemented in one or more computing systems, for example, a well site controller, a reservoir controller, a drilling controller, a data center, cloud environment, server, laptop, smartphone, tablet, an edge computing system, and other computing systems. The computing system can be located downhole, proximate the well site, or a distance from the well site, such as in a data center, cloud environment, or corporate location. Packoff prediction system 900 can be implemented as an application, a code library, a dynamic link library, a function, module, other software implementation, or combinations thereof. In some aspects, packoff prediction system 900 can be implemented in hardware, such as a ROM, a graphics processing unit, or other hardware implementation. In some aspects, packoff prediction system 900 can be implemented partially as a software application and partially as a hardware implementation. In some aspects, packoff prediction system 900 can be implemented wholly or partially by packoff prediction controller 1000 of FIG. 10.

Packoff prediction system 900 includes a packoff event modeler 910 which further includes a data transceiver 920, a packoff predictor 925, and a result transceiver 930. Data transceiver 920 can receive input parameters (such as a time interval to perform the packoff prediction, a weight distribution algorithm to utilize, a PRI threshold parameter indicating whether a user alert should be communicated or the system can proceed automatically, and other input parameters), real-time or near real-time sensor data from one or more downhole sensors or surface sensors (such as mechanical sensor data, borehole data, downhole fluid data, and other sensor data), input parameters from previous survey data (such as sensor data collected at a previous time interval), and input parameters from a data store (such as a stratigraphy, lithology, or data from proximate boreholes). Data transceiver 920 is capable of receiving input parameters for one or more portions of the borehole (such as if there is a dogleg portion and a separate horizontal portion of the borehole).

The input parameters can include parameters, instructions, directions, data, and other information to enable or direct the remaining processing of packoff prediction system 900. The data store can be one or more data stores, such as a database, a data file, a memory, a server, a laptop, a server, a data center, a cloud environment, or other types of data stores located proximate packoff event modeler 910 or distant from packoff event modeler 910.

Data transceiver 920 can receive the data and parameters from one or more sensors located proximate the drilling system or located elsewhere in the borehole or at a surface location. In some aspects, data transceiver 920 can receive various data from a computing system, for example, when a controller or computing system collects the data from the sensors and then communicates the data to data transceiver 920. The measurements collected by the sensors can be transformed into input parameters by the sensors, data transceiver 920, or another computing system.

Result transceiver 930 can communicate one or more calculated results, e.g., result parameters, to one or more other systems, such as a geo-steering system, a geo-steering controller, a well site controller, a drilling controller, a computing system, a BHA, drilling system, a user, or other borehole related systems. Other borehole related systems can include a computing system where packoff event modeler 910 is executing or be located in another computing system proximate or distant from packoff event modeler 910. Data transceiver 920 and result transceiver 930 can be, or can include, conventional interfaces configured for transmitting and receiving data. In some aspects, data transceiver 920 and result transceiver 930 can be combined into one transceiver. In some aspects, data transceiver 920, packoff predictor 925, and result transceiver 930 can be combined into one component. In some aspects, data transceiver 920 and result transceiver 930 can be implemented using communications interface 1010 of FIG. 10.

Packoff predictor 925 can implement the methods, processes, analysis, and algorithms as described herein utilizing the received data and input parameters, or at least some of the received data and input parameters, to determine, in some aspects, a PRI. In some aspects, packoff predictor 925 can determine adjusted input parameters using an uncertainty model. In some aspects, packoff predictor 925 can use one or more algorithms and systems, such as a machine learning system, a deep neural network system, a decision tree algorithm, a random forest algorithm, a logistic regression algorithm, a linear algorithm, a stochastic algorithm, and other statistical algorithms. In some aspects, packoff predictor 925 can utilize a weight distribution model to ascertain whether a PRI exceeds an event threshold along a portion of the distance interval. In some aspects, the weight distribution event threshold and the PRI can be communicated as part of the results to other borehole systems. In some aspects, packoff predictor 925 can be implemented using instructions and data utilizing processor 1030 of FIG. 10.

A memory or data storage of packoff predictor 925 or packoff event modeler 910 can be configured to store the processes and algorithms for directing the operation of packoff predictor 925.

The results from packoff event modeler 910 can be communicated to another system, such as a borehole operation system 950. Borehole operation system 950 can be one or more of a controller 960 (such as a well site controller, a drilling controller, or another controller), a geo-steering system 962, a BHA 964, a computing system 966, or a user 968. In aspects where user 968 receives the results, the results can include a visualization of the results, such as a depth and PRI visualization to assist the user in further decision making. The results can be used to direct the borehole operation system 950 in improving the efficiency of the borehole operation, such as adjusting the borehole operation plan, initiating a hole cleaning operations, or performing other remediation operations.

Figure 10:
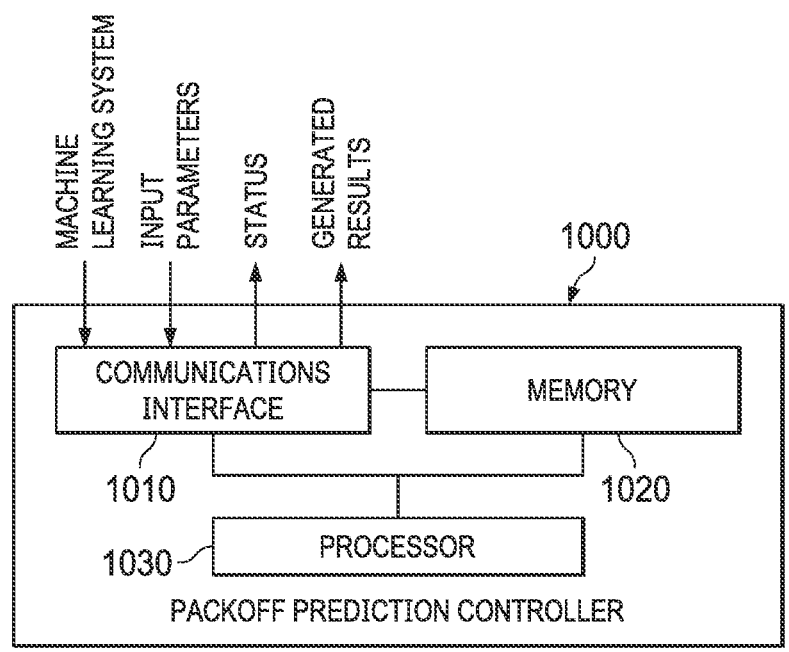
FIG. 10 is an illustration of a block diagram of an example of a packoff prediction controller constructed according to the principles of the disclosure.

FIG. 10 is an illustration of a block diagram of an example of packoff prediction controller 1000 according to the principles of the disclosure. Packoff prediction controller 1000 can be stored on a single computer or on multiple computers. The various components of packoff prediction controller 1000 can communicate via wireless or wired conventional connections. A portion or a whole of packoff prediction controller 1000 can be located downhole at one or more locations and other portions of packoff prediction controller 1000 can be located on a computing device or devices located at the surface or a distant location from the borehole. In some aspects, packoff prediction controller 1000 can be wholly located at a surface or distant location. In some aspects, packoff prediction controller 1000 is part of a geo-steering system, and can be integrated in a single device. In some aspects, packoff prediction controller 1000 can be an edge computing system.

Packoff prediction controller 1000 can be configured to perform the various functions disclosed herein including receiving input parameters and generating results from an execution of the methods and processes described herein. Packoff prediction controller 1000 includes a communications interface 1010, a memory 1020, and a processor 1030.

Communications interface 1010 is configured to transmit and receive data. For example, communications interface 1010 can receive the input parameters. Communications interface 1010 can transmit the PRI and uncertainty parameters, and other generated results, such as the adjusted input parameters. In some aspects, communications interface 1010 can transmit a status, such as a success or failure indicator of packoff prediction controller 1000 regarding receiving the input parameters, transmitting the generated results, or producing the generated results. In some aspects, communications interface 1010 can receive input parameters from a machine learning system, such as when the input parameters are pre-processed by a machine learning system or a deep neural network system prior to being utilized as an input into the described processes and methods. Communications interface 1010 can communicate via communication systems used in the industry. For example, wireless or wired protocols can be used. Communication interface 1010 is capable of performing the operations as described for data transceiver 920 and result transceiver 930.

Memory 1020 can be configured to store a series of operating instructions that direct the operation of processor 1030 when initiated, including the code representing the algorithms for determining the PRI and uncertainty parameters, as well as data, parameters, and other information. Memory 1020 is a non-transitory computer readable medium. Multiple types of memory can be used for data storage and memory 1020 can be distributed.

Processor 1030 can be configured to produce the generated results, including the PRI, uncertainty parameters, and statuses utilizing the received input parameters, and, if provided, the machine learning system or deep neural network system inputs. For example, processor 1030 can perform an analysis of the input parameters using an uncertainty model to generate adjusted input parameters, e.g., the uncertainty parameters, and utilize those input parameters to generate a PRI. Processor 1030 can be configured to direct the operation of the packoff prediction controller 1000. Processor 1030 includes the logic to communicate with communications interface 1010 and memory 1020, and perform the functions described herein to determine the alignment parameters and statuses. Processor 1030 is capable of performing or directing the operations as described by packoff predictor 925.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate arrays (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Capable, capable of, configured or configured to means, for example, designed, constructed, or programmed, with the necessary logic and/or features for performing a task or tasks.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

Each of the aspects disclosed in the SUMMARY section can have one or more of the following additional elements in combination. Element 1: communicating the output parameter to a well site controller, a drilling controller, or a user. Element 2: adjusting a drilling operation of the active borehole using the output parameter. Element 3: initiating a remediation operation to reduce the PRI. Element 4: producing a visualization of the PRI and communicating the visualization to a user. Element 5: generating a warning when a PRI threshold is not satisfied, where the warning is communicated to a system, a controller, or a user. Element 6: wherein the system or the controller utilizes the warning. Element 7: calculating a packoff reduction job action utilizing the PRI threshold. Element 8: implementing the packoff reduction job action. Element 9: repeating the packoff prediction process until an end of drilling stage event occurs, wherein the repeating occurs at a specified time interval. Element 10: pre-processing an input to the modifying and the input to the determining using an uncertainty model. Element 11: wherein the uncertainty model outputs a weighted distribution range of adjusted input parameters. Element 12: transforming the input parameters utilizing a machine learning system or a deep neural network system. Element 13: wherein a feedback from the output parameter is used to train the machine learning system or the deep neural network system. Element 14: comparing the PRI to a friction factor to quantify conditions within the active borehole prior to installing a casing in the active borehole. Element 15: wherein the comparing utilizes a geometrical parameter, mechanical parameter, a fluid parameter, or a hydromechanical coupling parameter. Element 16: wherein the determining utilizes a physics driven model, a data driven model, and an uncertainty model. Element 17: wherein the input parameters comprise a time interval to perform the packoff prediction process, a weight distribution algorithm to utilize, and a PRI threshold parameter. Element 18: wherein the input parameters comprise mechanical sensor data, active borehole data, downhole fluid data, stratigraphy, lithology, or proximate borehole data. Element 19: wherein the method is encapsulated as function or a microservice accessible by other functions or microservices. Element 20: wherein the drilling controller is capable of receiving the output parameter and of initiating a remediation operation at the active borehole or adjusting a borehole operation plan. Element 21: wherein the system is part of one or more of the well site controller, the drilling controller, a geo-steering system, a bottom hole assembly, or the computing system. Element 22: wherein the packoff predictor compares the PRI to a PRI threshold and communicates a warning when the PRI threshold is not satisfied. Element 23: wherein the packoff predictor is capable of generating a visualization of the PRI overlaid the location of the active borehole, and communicating the visualization to a user. Element 24: wherein the packoff predictor is capable of utilizing a machine learning system or a deep neural network system to transform the input parameters. Element 25: wherein the packoff predictor is capable of utilizing an uncertainty model to pre-process the input parameters and to generate an uncertainty parameter. Element 26: where the output parameter further comprises the uncertainty parameter. Element 27: wherein the packoff predictor is capable of implementing a physics driven model, a data driven model, and an uncertainty model. Element 28: further comprising a result transceiver, capable of communicating the output parameter to a borehole operation system.

What is claimed is:

1. A method to perform a packoff prediction process, comprising:
   receiving input parameters for at least one of an active borehole, a subterranean formation proximate the active borehole, or a drill string inserted in the active borehole;
   executing a hole cleaning model using the input parameters to estimate a bed height, a plug interaction model to connect the active borehole material accumulation with a movement of the drill string, and a hook load model to delink a borehole tortuosity effect from a torque parameter of the drill string;
   determining an initial packoff estimation using a packoff model, the bed height, an output of the plug interaction model, and the output of the hook load model;
   modifying a drag parameter of the drill string and the torque parameter of the drill string using the initial packoff estimation, wherein the drag parameter of the drill string is initially set to a viscous drag parameter of a fluid in the borehole combined with a drag parameter of borehole material, where the viscous drag parameter represents a fluid drag against the drill string and the drag parameter of the borehole material represents a mechanical drag of the borehole material against the drill string; and
   determining an output parameter comprising a packoff risk index (PRI) utilizing at least one of the input parameters, the output of the hole cleaning model, the bed height, the drag parameter, or the torque parameter, wherein the PRI indicates a likelihood of a packoff event occurring through a determination of an effectiveness of the hole cleaning model on the active borehole.

2. The method as recited in claim 1, further comprising:
   communicating the output parameter to a well site controller, a drilling controller, or a user; and
   adjusting a drilling operation of the active borehole using the output parameter.

3. The method as recited in claim 2, wherein the adjusting further comprises:
   initiating a remediation operation to reduce the PRI.

4. The method as recited in claim 1, further comprising:
   producing a visualization of the PRI and communicating the visualization to a user.

5. The method as recited in claim 1, further comprising:
   generating a warning when a PRI threshold is not satisfied, where the warning is communicated to a system, a controller, or a user.

6. The method as recited in claim 5, wherein the system or the controller utilizes the warning and further comprises:
   calculating a packoff reduction job action utilizing the PRI threshold; and
   implementing the packoff reduction job action.

7. The method as recited in claim 1, further comprising:
   repeating the packoff prediction process until an end of drilling stage event occurs, wherein the repeating occurs at a specified time interval.

8. The method as recited in claim 1, further comprising:
   pre-processing an input to the modifying and the input to the determining using an uncertainty model, wherein the uncertainty model outputs a weighted distribution range of adjusted input parameters.

9. The method as recited in claim 1, further comprising:
   transforming the input parameters utilizing a machine learning system or a deep neural network system, and wherein a feedback from the output parameter is used to train the machine learning system or the deep neural network system.

10. The method as recited in claim 1, further comprising:
    comparing the PRI to a friction factor to quantify conditions within the active borehole prior to installing a casing in the active borehole.

11. The method as recited in claim 10, wherein the comparing utilizes a geometrical parameter, mechanical parameter, a fluid parameter, or a hydromechanical coupling parameter.

12. The method as recited in claim 1, wherein the determining utilizes a physics driven model, a data driven model, and an uncertainty model.

13. The method as recited in claim 1, wherein the input parameters comprise a time interval to perform the packoff prediction process, a weight distribution algorithm to utilize, and a PRI threshold parameter.

14. The method as recited in claim 1, wherein the input parameters comprise mechanical sensor data, active borehole data, downhole fluid data, stratigraphy, lithology, or proximate borehole data.

15. The method as recited in claim 1, wherein the method is encapsulated as function or a microservice accessible by other functions or microservices.

16. A system, comprising:
    a data communications interface, capable of receiving input parameters from one or more of downhole sensors of an active borehole, surface sensors proximate the active borehole, a data store, a previous survey data, a well site controller, a drilling controller, or a computing system, wherein the input parameters include sensor data of a subterranean formation proximate the active borehole; and
    a packoff prediction controller, capable of using at least one of the input parameters to generate an output parameter, wherein the output parameter comprises a packoff risk index (PRI) for a location in the active borehole, where the PRI is calculated by determining a bed height using a hole cleaning model, a connection between material accumulation and movement of a drill string in the active borehole using a plug interaction model, and a borehole tortuosity effect on a torque parameter of the drill string using a hook load model, determining an initial packoff estimation using a packoff model, the hole cleaning model, an output of the plug interaction model, an output of the hook load model, and the bed height, and modifying a drag parameter of a drill string and the torque parameter of the drill string using the initial packoff estimation, wherein the drag parameter applied to the drill string is initially set to a viscous drag parameter of a fluid in the borehole combined with a drag parameter of borehole material, where the viscous drag parameter represents a fluid drag against the drill string and the drag parameter of the borehole material represents a mechanical drag of the borehole material against the drill string.

17. The system as recited in claim 16, further comprising: a result communications interface, capable of communicating the output parameter to a borehole operation system, and wherein the drilling controller is capable of receiving the output parameter and of initiating a remediation operation at the active borehole or adjusting a borehole operation plan.

18. The system as recited in claim 16, wherein the system is part of one or more of the well site controller, the drilling controller, a geo-steering system, a bottom hole assembly, or the computing system.

19. The system as recited in claim 16, wherein the packoff prediction controller compares the PRI to a PRI threshold and communicates a warning when the PRI threshold is not satisfied.

20. The system as recited in claim 16, wherein the packoff prediction controller is capable of generating a visualization of the PRI overlaid the location of the active borehole, and communicating the visualization to a user.

21. The system as recited in claim 16, wherein the packoff prediction controller is capable of utilizing a machine learning system or a deep neural network system to transform the input parameters.

22. The system as recited in claim 16, wherein the packoff prediction controller is capable of utilizing an uncertainty model to pre-process the input parameters and to generate an uncertainty parameter, where the output parameter further comprises the uncertainty parameter.

23. The system as recited in claim 16, wherein the packoff prediction controller is capable of implementing a physics driven model, a data driven model, and an uncertainty model.

24. A computer program product having a series of operating instructions stored on a non-transitory computer-readable medium that directs a data processing apparatus when executed thereby to perform operations, the operations comprising:

receiving input parameters for at least one of an active borehole, a subterranean formation proximate the active borehole, or a drill string inserted in the active borehole;

executing a hole cleaning model using the input parameters to estimate a bed height, a plug interaction model to connect the active borehole material accumulation with a movement of the drill string, and a hook load model to delink a borehole tortuosity effect from a torque parameter;

determining an initial packoff estimation using a packoff model, the bed height, an output of the plug interaction model, and an output of the hook load model;

modifying a drag parameter of the drill string and the torque parameter of the drill string using the initial packoff estimation, wherein the drag parameter of the drill string is initially set to a viscous drag parameter of a fluid in the borehole combined with a drag parameter of borehole material, where the viscous drag parameter represents a fluid drag against the drill string and the drag parameter of the borehole material represents a mechanical drag of the borehole material against the drill string; and determining an output parameter comprising a packoff risk index (PRI) utilizing at least one of the input parameters, the output of the hole cleaning model, the bed height, the drag parameter, or the torque parameter, wherein the PRI indicates a likelihood of a packoff event occurring through a determination of an effectiveness of the hole cleaning model on the active borehole.

25. The computer program product as recited in claim 24, wherein the borehole material is one or more of material from the subterranean formation, cuttings, or portions of downhole tools.

* * * * *